United States Patent [19]
Urasawa

[11] Patent Number: 6,101,002
[45] Date of Patent: Aug. 8, 2000

[54] HALFTONE-SCREEN DITHER PATTERN GENERATING METHOD

[75] Inventor: Koji Urasawa, Tokyo, Japan

[73] Assignee: Oki Data Corporation, Tokyo, Japan

[21] Appl. No.: 08/976,137

[22] Filed: Nov. 18, 1997

[30] Foreign Application Priority Data

Dec. 16, 1996 [JP] Japan ................................. 8-335875

[51] Int. Cl.⁷ ................................................. H04N 1/40
[52] U.S. Cl. .......................... 358/456; 358/457; 358/534; 358/535; 358/536; 358/298
[58] Field of Search .................... 358/455, 456, 358/457, 534, 535, 536, 298

[56] References Cited

U.S. PATENT DOCUMENTS

| | | | |
|---|---|---|---|
| 4,987,498 | 1/1991 | Shimazaki | 358/456 |
| 5,107,349 | 4/1992 | Ng et al. | 358/457 |
| 5,172,248 | 12/1992 | Urabe et al. | 358/298 |
| 5,235,435 | 8/1993 | Schiller | 358/298 |
| 5,315,407 | 5/1994 | Sakamoto et al. | 358/456 |
| 5,371,612 | 12/1994 | Sakamoto | 358/298 |
| 5,396,607 | 3/1995 | Shimatani | 358/456 |
| 5,398,118 | 3/1995 | Satoh et al. | 358/456 |
| 5,418,627 | 5/1995 | Sato et al. | 358/455 |
| 5,542,029 | 7/1996 | Karlsson | 358/298 |
| 5,581,372 | 12/1996 | Kerz | 358/456 |
| 5,786,843 | 7/1998 | Venkateswar | 358/455 |

*Primary Examiner*—Thomas D. Lee
*Attorney, Agent, or Firm*—Akin, Gump, Strauss, Hauer & Feld, L.L.P.

[57] ABSTRACT

Dither patterns are generated for use in converting a gray-scale image to a bi-level image. The dither patterns simulate halftone screen patterns with arbitrary screen angles. The dither patterns are made up of unit patterns, and have sizes calculated so that the unit patterns match up at the edges of the dither pattern.

18 Claims, 15 Drawing Sheets

FIG. 14
```
 1  2  7  8| 5  6 11 12| 9 10 15 16|13 14  3  3
 5  6  7 12| 9 10 15 16|16|13  2  3  4| 1  6  7
12| 9 10 15 16|13 14  3  4| 1  6  7  8| 5 10 11
16|13 14  3  4| 1  2  7  8| 5  6 11 12| 9 14 15
 4| 1  2  7  8| 5  6 11 12| 9 10 15 16|13 13| 2
 8| 5  6 11 12| 9 10 14 15 16|13  2  3  4| 1  6
11 12| 9 14 15 16|13  2  3  4| 1  6  7  8| 5 10
15 16|13  2  3  4| 1  6  7  8| 5 10 11 12| 9 14
 3  4| 1  6  7  8| 5 10 11 12| 9 14 15 15 16| 1
 7  8| 5  6 11 12|12|13 14 15 16| 1  2  3  4| 5
10 11 12| 9 14 15 16|13| 2  3  4| 5  6  7  8| 9
14 15 16|13| 2  3  4| 1  6  7  8| 5 10 11 12|13
 2  3  4| 1  6  7  8| 5 10 11 12| 9 13 14 15 16
 6  7  8| 5  9 10 11 12|13 14 15 16| 1  2  3  4
 9 10 11 12|13 14 15 16| 1| 2  3  4| 5  6  7  8
 9 14 15 16| 1  2  3  4| 5  6  7  8| 9 10 11 12
```
FIG. 15A
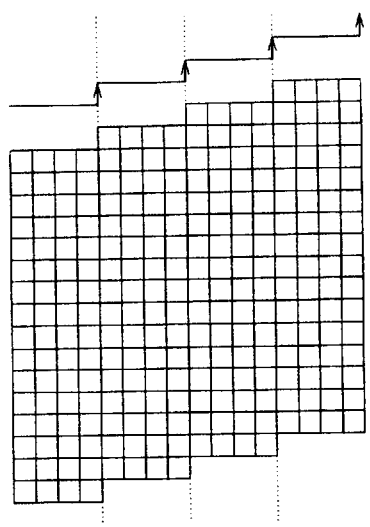
FIG. 15B
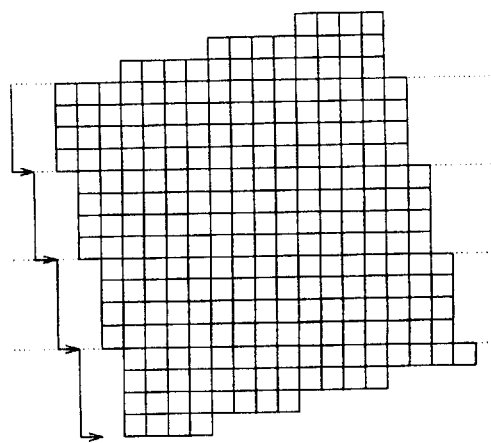

FIG. 18
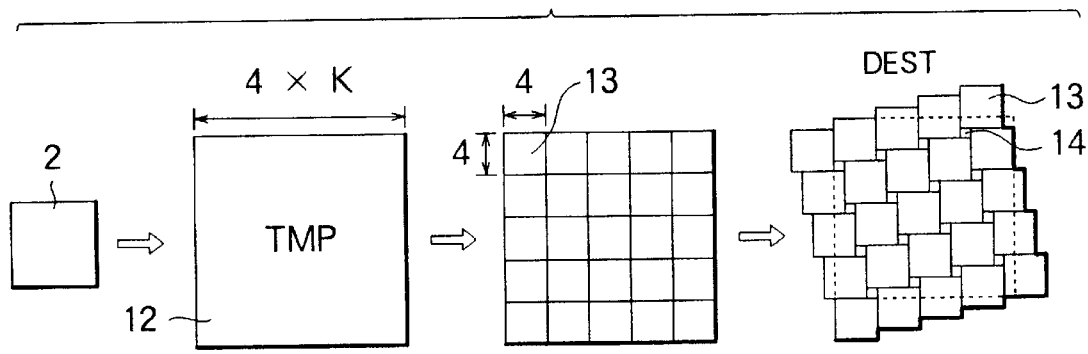
FIG. 19
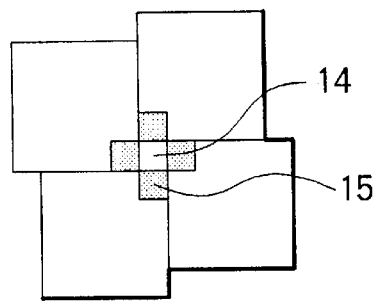
FIG. 20A    FIG. 20B
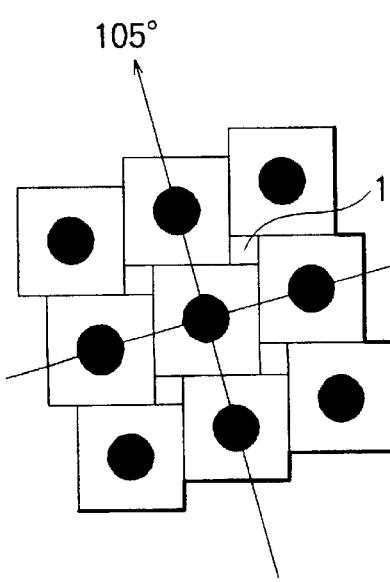 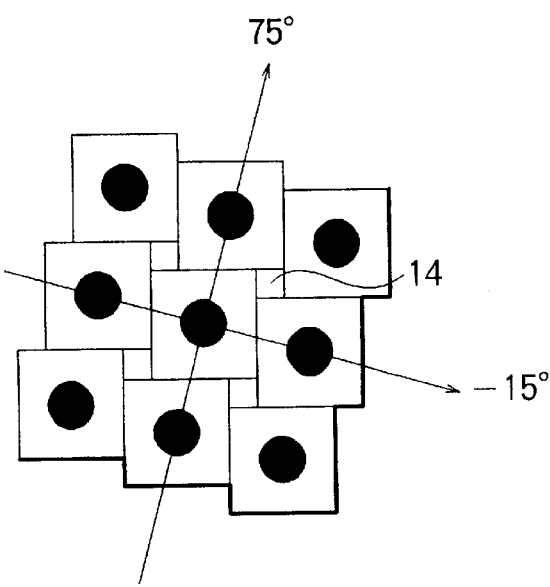

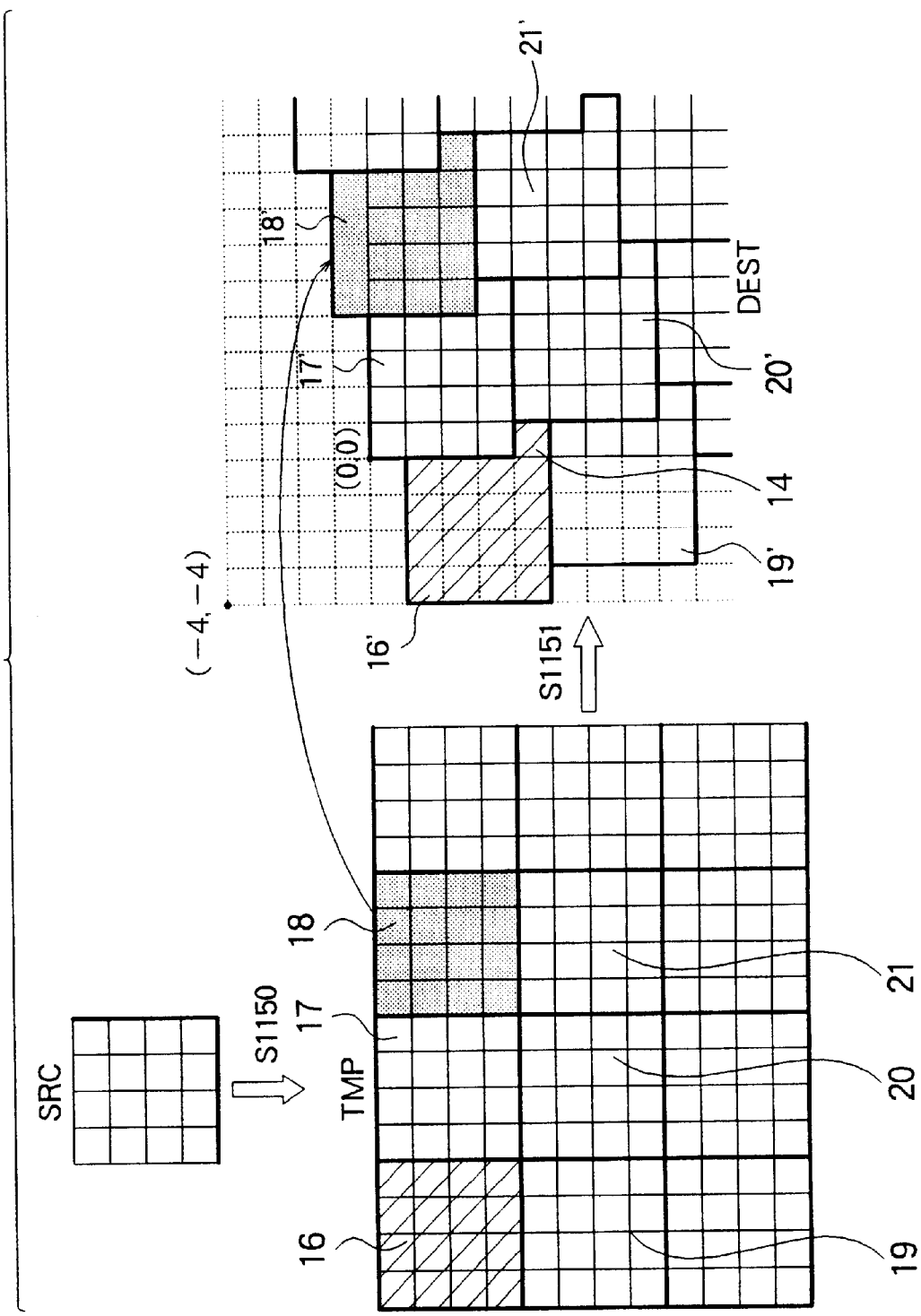

HALFTONE-SCREEN DITHER PATTERN GENERATING METHOD

BACKGROUND OF THE INVENTION

The present invention relates to a method and apparatus for generating dither patterns for use in converting a gray-scale image to a bi-level image having the appearance of an image photographed through a screen.

Dithering converts a monochrome or color gray-scale image to a monochrome or color bi-level image in which different gray levels are expressed by different densities of equal-sized dots, so that the image can be printed or displayed by a device capable only of bi-level image output. Dithering employs a matrix of threshold values with which the values of picture elements or pixels in the image are compared, the same matrix pattern being employed repeatedly to cover the image.

Photographing an image through a screen is a technique used to produce the halftone images printed in newspapers and magazines. This technique produces a bi-level image comprising a rectilinear pattern of dots, in which different gray levels are expressed by different dot sizes. To reduce the obviousness of the dot pattern, the screen is generally tilted at an angle, referred to as the screen angle. Halftone printing can reproduce images with a quite natural appearance, so there is interest in simulating this appearance by dithering.

Creating a dither matrix that simulates a halftone screen with a screen angle of forty-five degrees is not difficult, but for arbitrary screen angles, matters are not simple. Rotating a standard pattern of threshold values through the desired screen angle creates problems in distributing the threshold values into the dither matrix cells, and in aligning adjacent copies of the dither matrix to cover the image. Furthermore, if the dither matrix has the wrong size, extraneous dots that interfere with the halftone effect may be produced in the output bi-level image, as will be illustrated later.

SUMMARY OF THE INVENTION

An object of the present invention is to provide a method and apparatus for generating dither patterns that simulate the effect of a halftone screen with an arbitrary screen angle.

According to a first aspect of the invention, a unit pattern size and screen angle $\theta$ are supplied as input parameters, and a unit pattern of the specified size is generated by placing threshold values in a predetermined order in a first matrix of cells. A dither pattern size of the form $(m \times \cos\theta) + (n \times \sin\theta)$ is calculated, where m and n are multiples of the unit pattern size, and $m \times \sin\theta$ is equal to $n \times \cos\theta$, within a certain level of precision. The first matrix and a second matrix are placed in a two-dimensional Cartesian coordinate system, the second matrix having the calculated dither pattern size. Both matrices have sides parallel to the coordinate axes. Each cell in the second matrix is rotated around the origin of the coordinate system by the screen angle $\theta$, then moved parallel to the coordinate axes in steps equal to the unit pattern size, until the cell is centered within a corresponding cell in the first matrix. The cell then receives the threshold value of the corresponding cell in the first matrix. After all cells in the second matrix have been assigned values in this way, the second matrix provides the desired dither pattern.

According to a second aspect of the invention, a unit pattern size is supplied as an input parameter, and a unit pattern of the specified size is generated by placing threshold values in a predetermined order in a first matrix of cells. A second matrix of cells is generated by placing N×N copies of the first matrix vertically and horizontally adjacent to one another, N being an integer greater than unity. Each column of cells in the second matrix is shifted vertically by an amount equal to an integer part of the column coordinate divided by N, and each row in the second matrix is shifted horizontally by an amount equal to an integer part of the row coordinate divided by N. Cells shifted out of the second matrix in these operations wrap around to the opposite side of the second matrix. After these shifting operations, the second matrix provides the desired dither pattern.

According to a third aspect of the invention, a unit pattern size is supplied as an input parameter, and a unit pattern of the specified size is generated by placing threshold values in a predetermined order in a first matrix of cells. The least common multiple of the unit pattern size and a positive integer N is calculated. A temporary matrix of cells is generated, with a size equal to (N+1) times the least common multiple, by placing copies of the first matrix vertically and horizontally adjacent to one another. The temporary matrix is divided into N×N blocks, and an extra cell is added to each N×N block, in a predetermined position adjacent a predetermined corner cell of the block. The resulting (N×N)+1-cell blocks are used to tile a second matrix having a size equal to (N+1/N) times the above least common multiple, the extra cells receiving threshold values equal to the maximum of the adjacent threshold values, and cells overflowing the boundaries of the second matrix being discarded. The second matrix provides the desired dither pattern.

The dither pattern sizes used in all three aspects of the invention cause the dither patterns to simulate halftone screen patterns without extraneous dots. The first aspect provides dither patterns for arbitrary screen angles, while the second and third aspects provide dither patterns for screen angles substantially equal to the arctangents of N and 1/N.

BRIEF DESCRIPTION OF THE DRAWINGS

In the attached drawings:

FIG. 14 shows part of a dither pattern having a screen angle of fifteen degrees.

FIGS. 15A and 15B illustrate the operation of a third embodiment of the invention;

FIG. 18 illustrates the operation of a fourth embodiment of the invention;

FIG. 19 shows part of FIG. 18 in more detail;

FIGS. 20A and 20B illustrate halftone patterns generated by the fourth embodiment with screen angles of fifteen degrees and forty-five degrees;

FIG. 22 further illustrates the operation of the dither pattern rotator in the fourth embodiment.

DETAILED DESCRIPTION OF THE INVENTION

Embodiments of the invention will be described with reference to the attached illustrative drawings.

First Embodiment

Figure 1A:
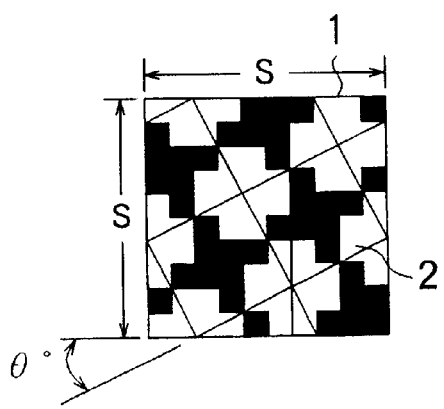
FIG. 1A shows a dither pattern made up of unit patterns.
Figure 1B:
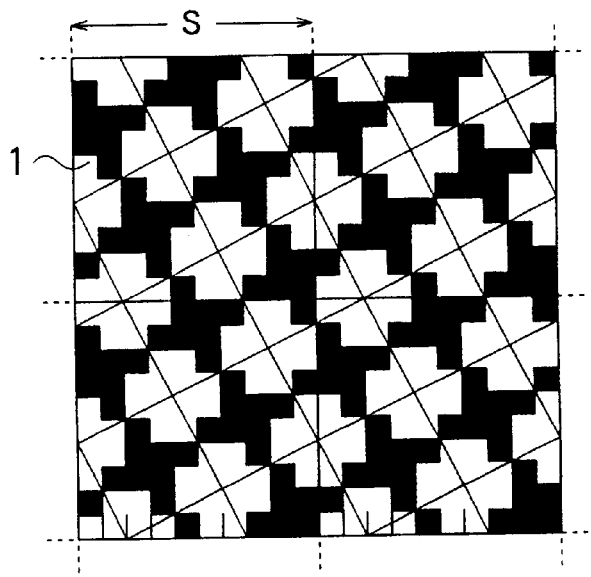
FIG. 1B shows an area tiled by the dither pattern in FIG. 1A.

By way of explanation of dither patterns and screen angles, FIG. 1A shows a dither pattern 1, and FIG. 1B shows an area tiled by four of these dither patterns 1. The dither pattern 1 is a ten-by-ten square matrix of black and white dots, grouped to form part of a simulated halftone dot pattern with a screen angle $\theta$. The angle $\theta$ is an angle between the horizontal sides of the pattern and an axis of translational symmetry of the pattern. Another axis of translational symmetry is disposed at an angle of $\theta$ to the vertical sides. Lines parallel to these axes of symmetry dissect the dither pattern 1, and the larger area in FIG. 1B, into a number of identical oblique square unit patterns 2, in positions corresponding to the apertures in a traditional halftone screen.

A feature of the present invention is that the length S of the sides of the dither pattern 1 causes the unit patterns 2 to match up at the edges of the dither patterns 1, forming the seamless regular tiling shown in FIG. 1B. This feature enables the first embodiment to simulate the effect of printing with a halftone screen.

Figure 1C:
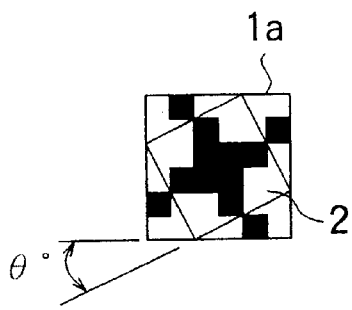
FIG. 1C shows a dither pattern having the wrong size.
Figure 1D:
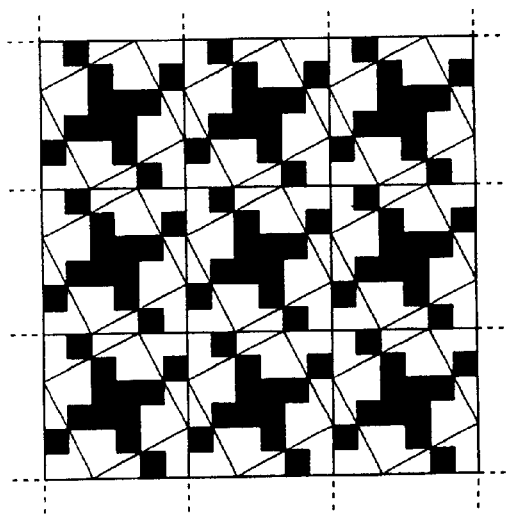
FIG. 1D shows an area tiled by the dither pattern in FIG. 1C.

For comparison, FIG. 1C shows a dither pattern 1a created using the same unit pattern 2 and screen angle $\theta$, but having a different size. When this dither pattern 1a is used to tile an area as in FIG. 1D, the unit patterns do not match up, and the simulated halftone dot pattern is broken up by extraneous block dots.

Figure 2:
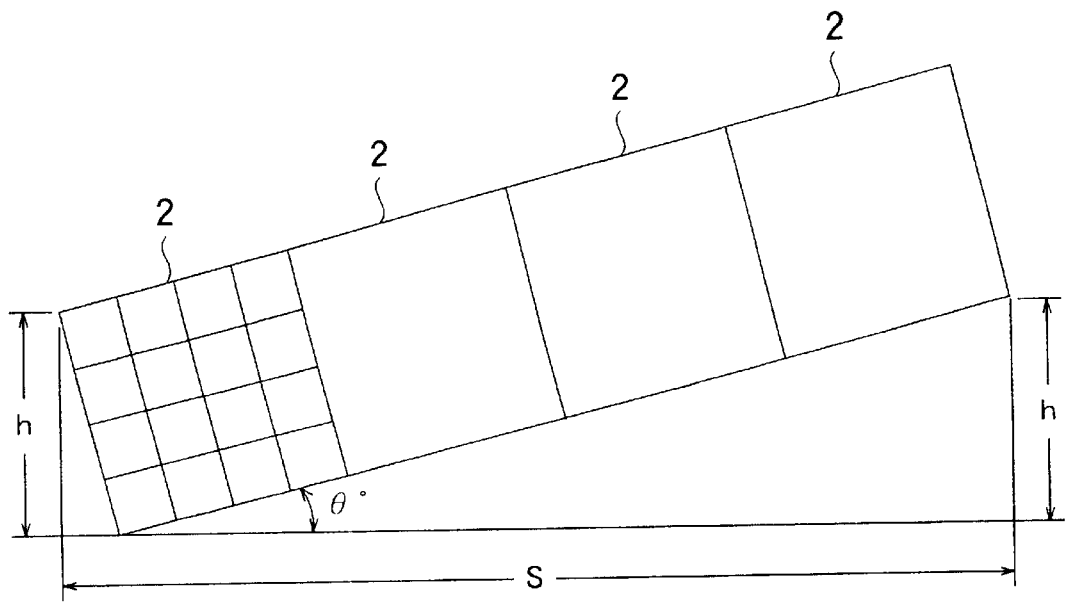
FIG. 2 illustrates the geometrical conditions for a correct dither pattern size.

FIG. 2 shows a way of obtaining conditions for the unit patterns 2 to match up. The letter S again designates the length of one side of the dither pattern. If n is the length of one side of the unit pattern 2 and m is four times that length, then in FIG. 2, $$h = m \times \sin\theta = n \times \cos\theta$$

$$S = m \times \cos\theta + n \times \sin\theta$$

More generally, if m and n are any two integer multiples of the unit pattern size such that m×sin $\theta$ is equal to n×cos $\theta$, then the above formula for S gives an appropriate dither pattern size for a screen angle of $\theta$.

Figure 3:
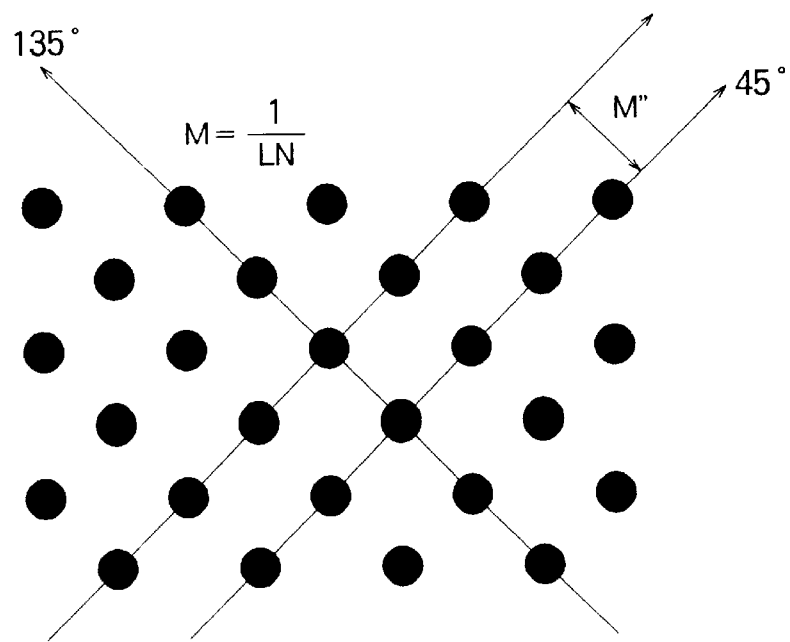
FIG. 3 illustrates a halftone dot pattern, showing the screen angle and line number.

FIG. 3 illustrates the concepts of screen angle and line number in a halftone pattern of dots. Different gray levels are represented by varying the size of the dots. The axes of translational symmetry of the pattern are at angles of forty-five degrees and one hundred thirty-five degrees to the horizontal. The pattern is made up of lines of dots disposed at these angles. The screen angle is forth-five degrees. The density of the lines is usually expressed in lines per inch, as a line number (LN). For example, a line number of sixty means sixty lines per inch. The spacing M" between lines is the reciprocal of the line number, e.g. one sixtieth of an inch.

Figure 4:
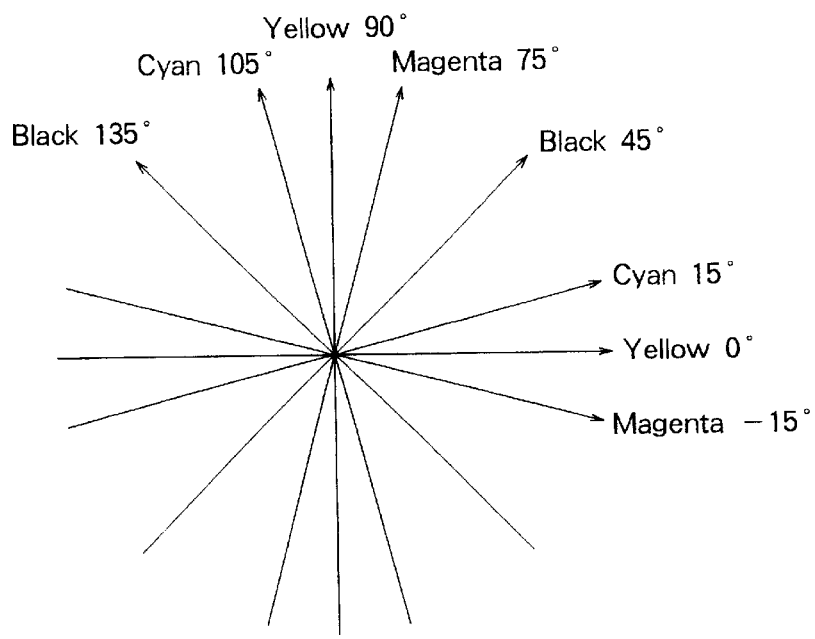
FIG. 4 shows examples of screen angles used in color printing.

In color printing, to make the lines of dots less obvious and suppress moire patterns, different screen angles are used for different colors. FIG. 4 shows a typical set of angles for printing with ink of the colors cyan, magenta, yellow, and black. The darkest color (black) is given the least obvious screen angle (forty-five degrees). The lightest color (yellow) is given the most obvious screen angle of zero. Cyan and magenta have intermediate screen angles of fifteen degrees and seventy-five degrees, respectively. The same line number is used for all four colors.

Dither patterns can be generated with a personal computer system having a central processing unit, memory, display, and keyboard or other input device. The computer's memory may include, for example, both semiconductor memory devices and rotating disk storage.

Figure 5:
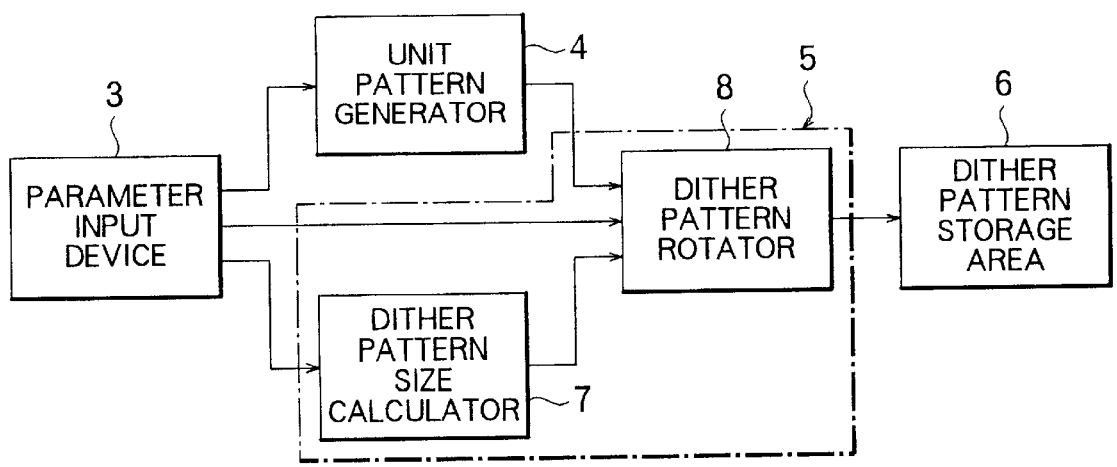
FIG. 5 is a block diagram of a first embodiment of the invention.

As a first embodiment of the invention, FIG. 5 shows the relevant parts of a computer system having a parameter input device 3, a unit pattern generator 4, a dither pattern generator 5, and a dither pattern storage area 6, the dither pattern generator 5 comprising a dither pattern size calculator 7 and dither pattern rotator 8. The parameter input device 3 is, for example, the computer's keyboard. The unit pattern generator 4 and dither pattern generator 5 comprise programs, stored in the computer's memory, that are executed by the computer's central processing unit. These programs include, for example, a program that generates unit patterns, a program that calculates the size of a dither pattern, a program that sets threshold values in the dither pattern, and a program that stores the dither pattern in the dither pattern storage area 6. The dither pattern storage area 6 is, for example, a file storage area in the computer's memory.

The operation of the first embodiment will be described with reference to FIGS. 6 to 10.

Figures 6, 7:
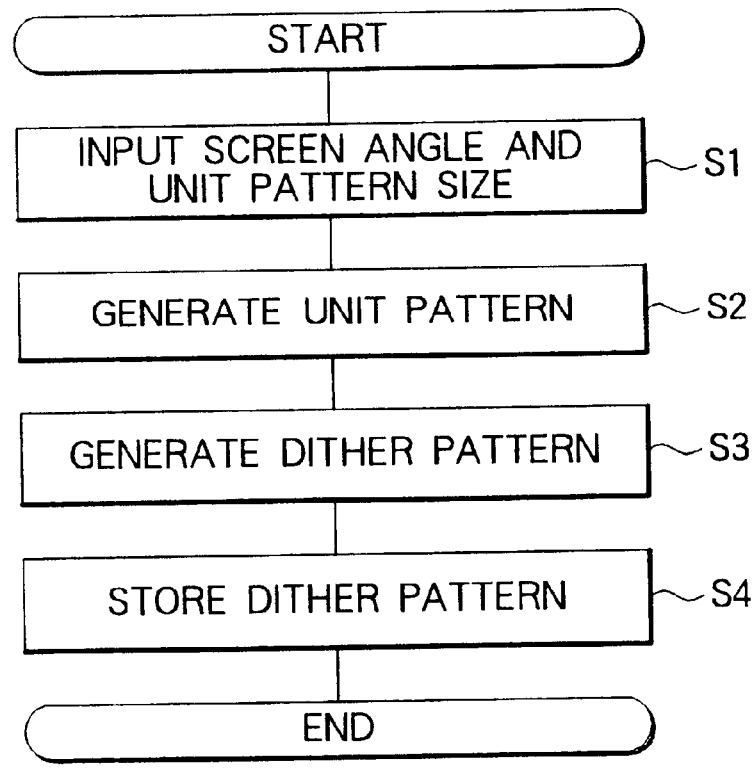
FIG. 6 is a flowchart illustrating the operation of the first embodiment.
FIG. 7 shows an example of a unit pattern generated by the unit pattern generator in the first embodiment.

The operation begins with the input of the desired unit pattern size and screen angle from the parameter input device 3 (step S1 in FIG. 6). The unit pattern generator 4 then generates a unit pattern of the specified size by placing threshold values in a predetermined order in a square matrix of cells (step S2), and stores the resulting unit pattern in the computer's memory.

FIG. 7 shows an example of threshold values placed in a four-by-four matrix. The threshold values increase with increasing distance from the center of the matrix. When a gray-level image is converted to a bi-level image by comparing the gray levels of picture elements with these threshold values, if the gray levels are all the same, the pattern in FIG. 7 produces a simulated halftone dot centered near the center of the matrix, the size of the simulated halftone dot varying depending on the gray level.

In the following description, the terms 'matrix' and 'pattern' will be used interchangeably. The matrix in FIG. 7 is a unit pattern, with a unit pattern size of four.

From this unit pattern and the screen angle, the dither pattern generator 5 next generates a dither pattern (step S3 in FIG. 6). This process is detailed in the flowcharts in FIGS. 8 and 9. UNIT is the unit pattern size, that is, the number of cells on each side of the unit pattern, and θ is the screen angle.

Figure 8:
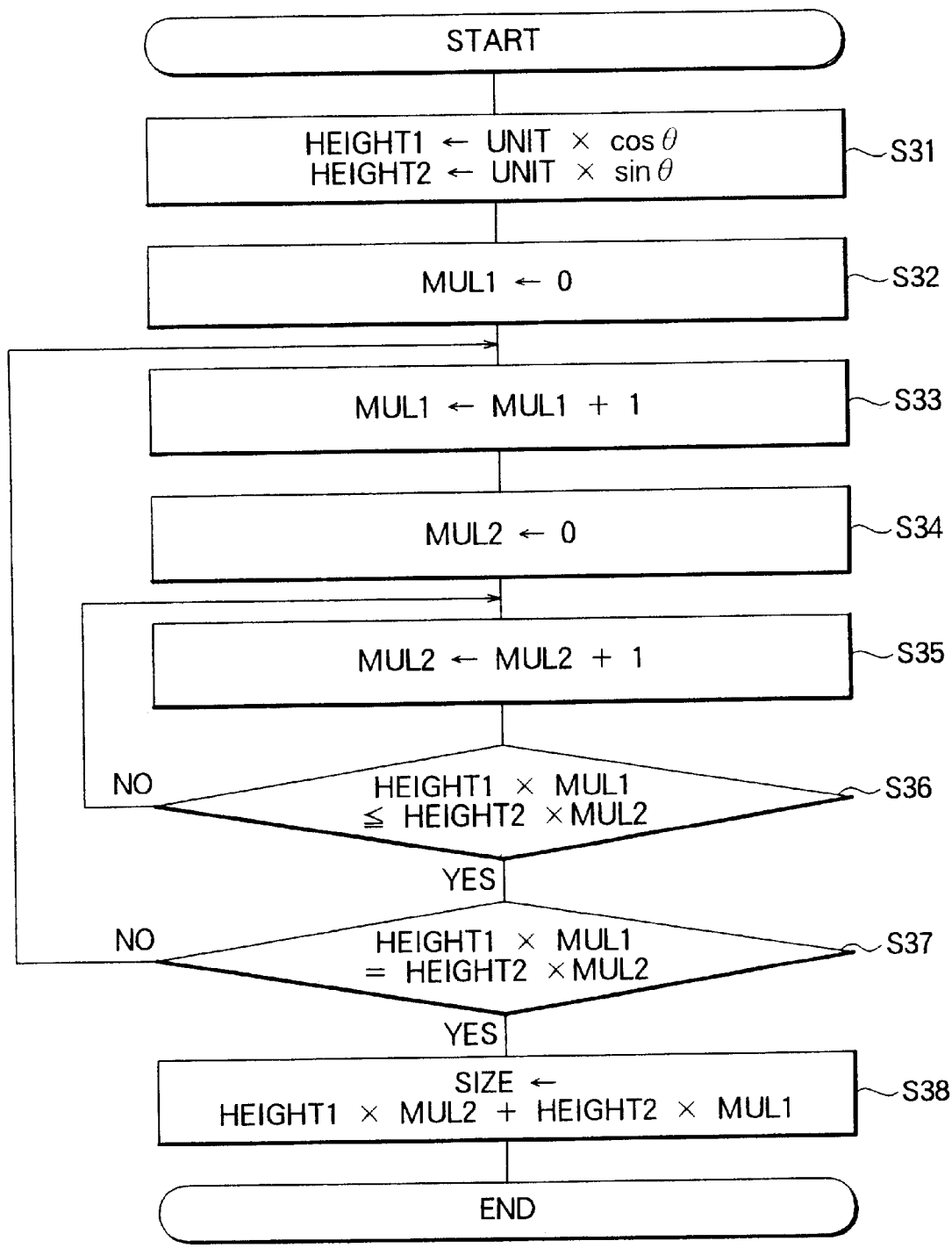
FIG. 8 is a flowchart illustrating the operation of the dither pattern size calculator in the first embodiment.

In step S31 in FIG. 8, the dither pattern size calculator 7 calculates UNIT×cos θ and assigns this value to a variable HEIGHT1, by storing the value in a register assigned to HEIGHT1. Similarly, the dither pattern size calculator 7 calculates UNIT×sin θ and stores this value in a register assigned to a variable HEIGHT2.

In step S32, the value zero is stored in a register assigned to a variable MUL1. In step S33, the MUL1 register is incremented by one.

In step S34, the value zero is stored in a register assigned to a variable MUL2. In step S35, the MUL2 register is incremented by one.

In step S36, the dither pattern size calculator 7 tests the following condition:

$$\text{HEIGHT1} \times \text{MUL1} \leq \text{HEIGHT2} \times \text{MUL2}$$

If this condition is true, the dither pattern size calculator 7 proceeds to step S37; otherwise the dither pattern size calculator 7 returns to step S35 to increment MUL2 again. The dither pattern size calculator 7 continues to increment MUL2 until the above condition becomes true.

In step S37, the dither pattern size calculator 7 tests the following condition, to a certain precision level:

$$\text{HEIGHT1} \times \text{MUL1} = \text{HEIGHT2} \times \text{MUL2}$$

The testing of this condition must be limited to a certain precision level because HEIGHT1 and HEIGHT2 are real variables with, in theory, unlimited precision. A practical criterion is to consider the condition to be true if the integer part of HEIGHT1×MUL1 matches the integer part of HEIGHT2×MUL, or if the integer parts and first fraction digits match.

The dither pattern size calculator 7 proceeds to step S38 if the above condition is true, and returns to step S33 if this condition is false. The loop from step S33 to step S37 is repeated until this condition becomes true.

In step S39, the dither pattern size calculator 7 calculates the following value, rounds this value off to integer precision, and stores the resulting integer value in a register assigned to a variable SIZE, designating the dither pattern size.

$$(\text{HEIGHT1} \times \text{MUL2}) + (\text{HEIGHT2} \times \text{MUL1})$$

Figure 9:
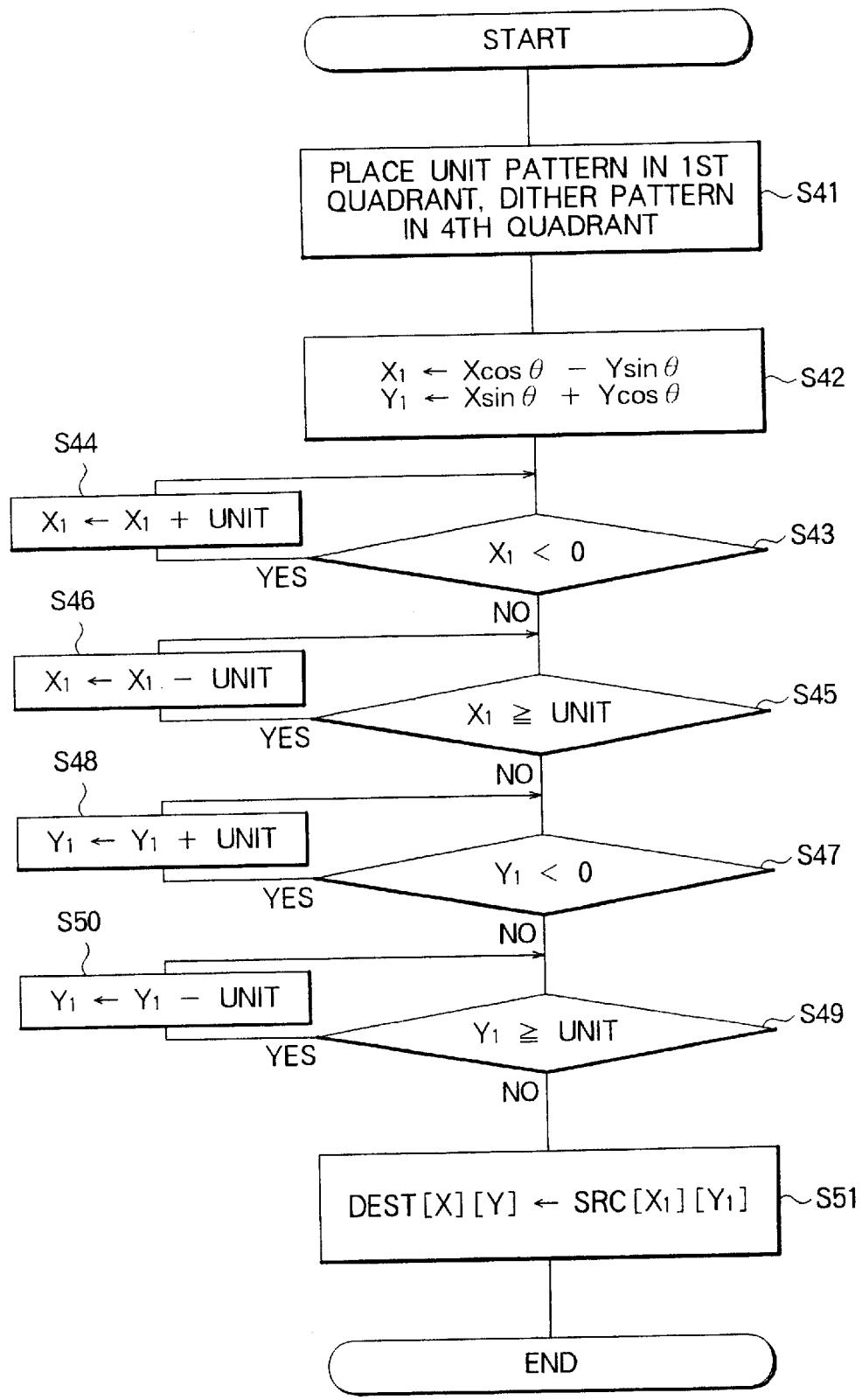
FIG. 9 is a flowchart illustrating the operation of the dither pattern rotator in the first embodiment.
Figure 10:
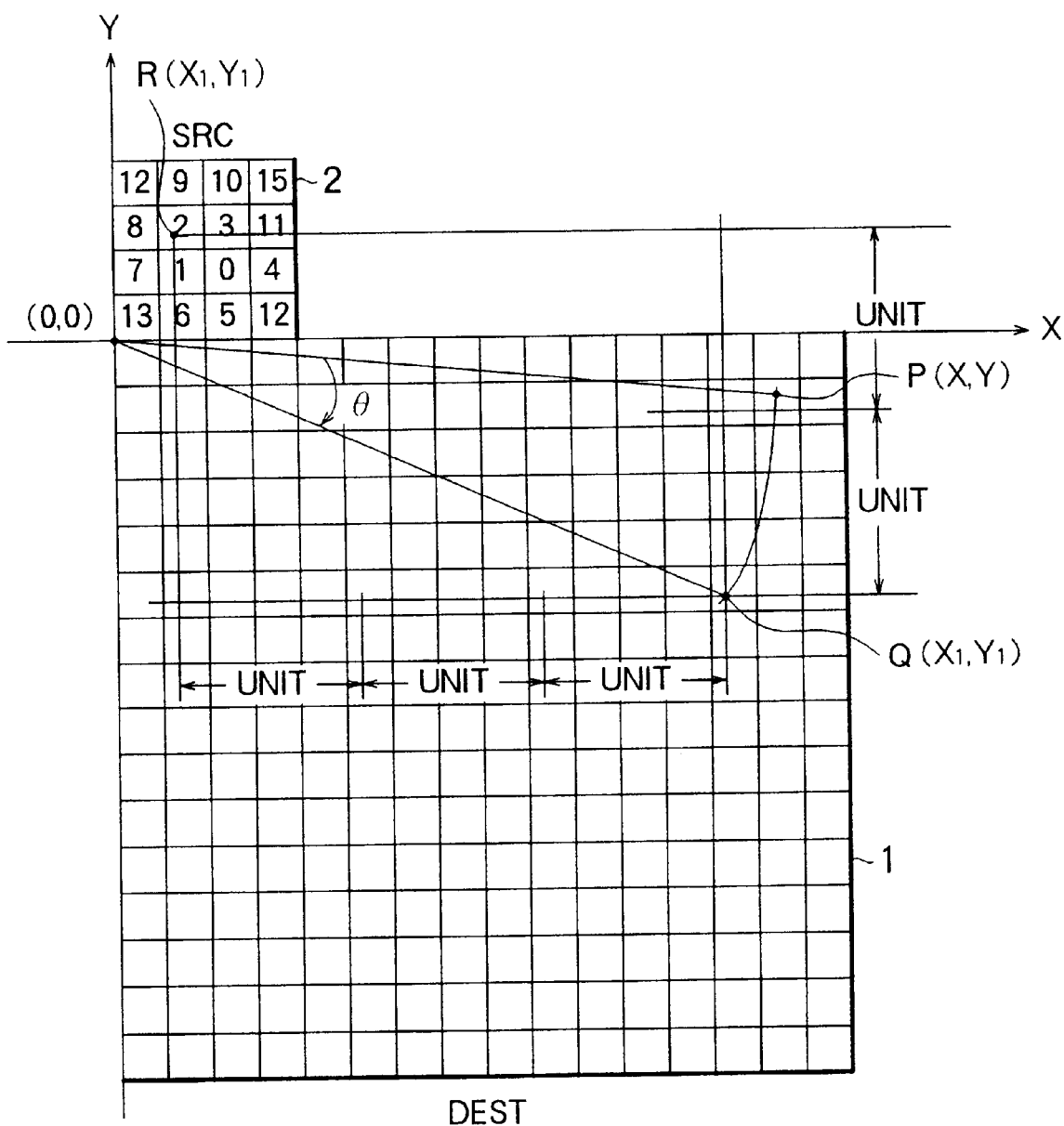
FIG. 10 further illustrates the operation of the dither pattern rotator by showing the unit pattern and dither pattern placed in a Cartesian coordinate system.

Next, in step S41 in FIG. 9, the dither pattern rotator 8 assigns coordinates to the unit pattern and dither pattern. Referring to FIG. 10, the unit pattern is placed as a matrix of cells, named SRC, in the first quadrant of a two-dimensional Cartesian (X-Y) coordinate system, with one corner of the matrix SRC at the origin of the coordinate system. For the dither pattern, a matrix of cells, named DEST, is placed in the fourth quadrant of the same coordinate system, with one corner at the origin. The number of cells on each side of the DEST matrix is the dither pattern size as calculated above.

The rows and columns of both matrices SRC and DEST have integer coordinate values. The cells will be identified below by these coordinates. For example, the cell in the bottom left corner of the unit pattern will be identified as SRC00.

For each cell P in the dither matrix DEST, the dither pattern rotator 8 now carries out the process from step S42 to step S51 in FIG. 9.

In step S42, the dither pattern rotator 8 places the coordinates X and Y of the center point P(X, Y) of cell P in two registers, then calculates two new coordinates $X_1$ and $Y_1$ by the equations given below, and stores the values of $X_1$ and $Y_1$ in two other registers.

$$X_1 = X \cos \theta - Y \sin \theta$$

$$Y_1 = X \sin \theta + Y \cos \theta$$

These operations rotate the point P(X, Y) clockwise by by the screen angle θ around the origin of the coordinate system to a new point $Q(X_1, Y_1)$.

In step S43, the dither pattern rotator 8 checks the sign of $X_1$. If $X_1$ is negative, the dither pattern rotator 8 increases $X_1$ by adding the unit pattern size UNIT in step S44, then returns to step S43 to check the sign of $X_1$ again. This process is repeated until $X_1$ is non-negative.

In step S45, the dither pattern rotator 8 compares $X_1$ with the unit pattern size. If $X_1$ is equal to or greater than the unit pattern size, in step S46 the dither pattern rotator 8 decreases $X_1$ by subtracting the unit pattern size. Steps S45 and S46 are repeated until $X_1$ is less than the unit pattern size.

In steps S47 and S48, the dither pattern rotator 8 checks the sign of $Y_1$, and if $Y_1$ is negative, increases $Y_1$ in steps of the unit pattern size until $Y_1$ is non-negative.

In steps S49 and S50, the dither pattern rotator 8 compares $Y_1$ with the unit pattern size, and if $Y_1$ is equal to or greater than the unit pattern size, decreases $Y_1$ in steps of the unit pattern size until $Y_1$ is less than the unit pattern size.

Steps S43 to S50 move the point $Q(X_1, Y_1)$ parallel to the coordinate axes, in steps equal to the unit pattern size, until $X_1$ and $Y_1$ both have non-negative values less than the unit pattern size, designating a point $R(X_1, Y_1)$ in the unit pattern matrix in the first quadrant.

In step S51, using [X], [Y], [$X_1$], and [$Y_1$] to designate the integer parts of X, Y, $X_1$ and $Y_1$, respectively, the dither pattern rotator 8 assigns the threshold value in cell SRC[$X_1$][$Y_1$] to cell DEST[X][Y] in the dither matrix.

As threshold values are assigned to the dither pattern DEST, they are also stored in the dither pattern storage area 6, completing step S4 in FIG. 6.

The first embodiment generates a dither pattern that tiles the plane in the seamless manner illustrated in FIG. 1B, unit patterns aligning at the edges of adjacent dither patterns. When this dither pattern is used to convert a gray-scale image to a bi-level image, the dither pattern produces a pattern of simulated halftone dots with the specified screen angle, without generating extraneous dots. Dither patterns of this type enable an ink-jet printer or electrophotographic printer, for example, to reproduce natural color images in an attractive manner.

Second Embodiment

Figure 11:
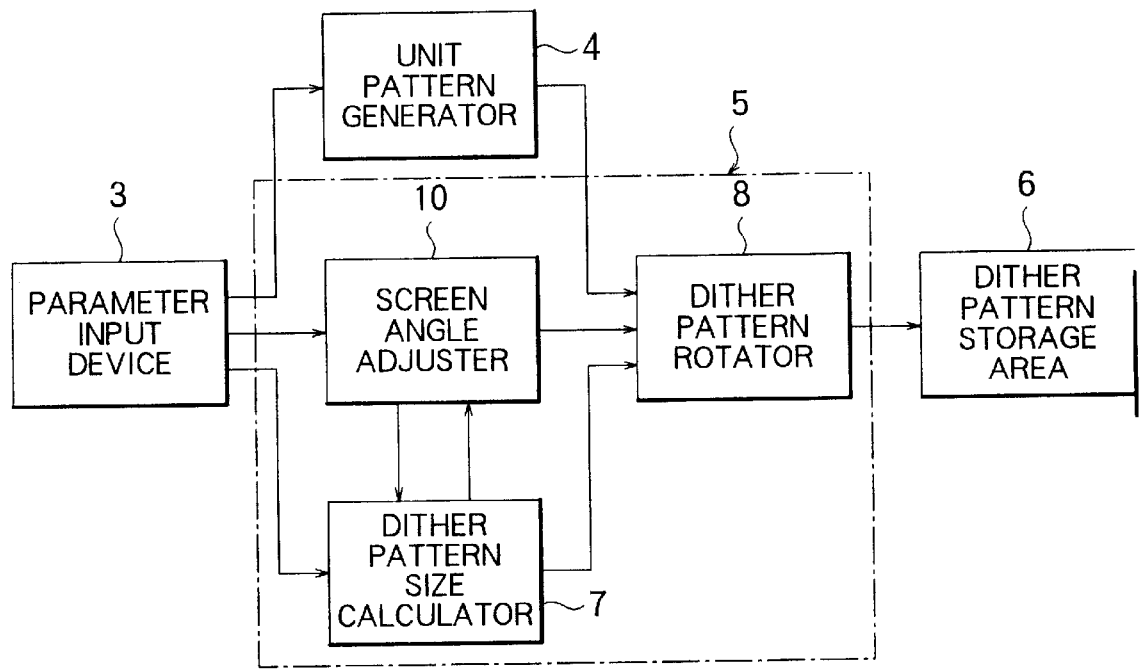
FIG. 11 is a block diagram of a second embodiment of the invention.

Referring to FIG. 11, the second embodiment has the same elements as the first embodiment, shown with the same reference numerals as in FIG. 5, and an additional screen angle adjuster 10 disposed in the dither pattern generator 5. The screen angle adjuster 10 adjusts the screen angle so that the dither pattern size does not exceed a predetermined limit.

The operation of the second embodiment will be described with reference to the flowcharts in FIGS. 12 and 13.

Figure 12:
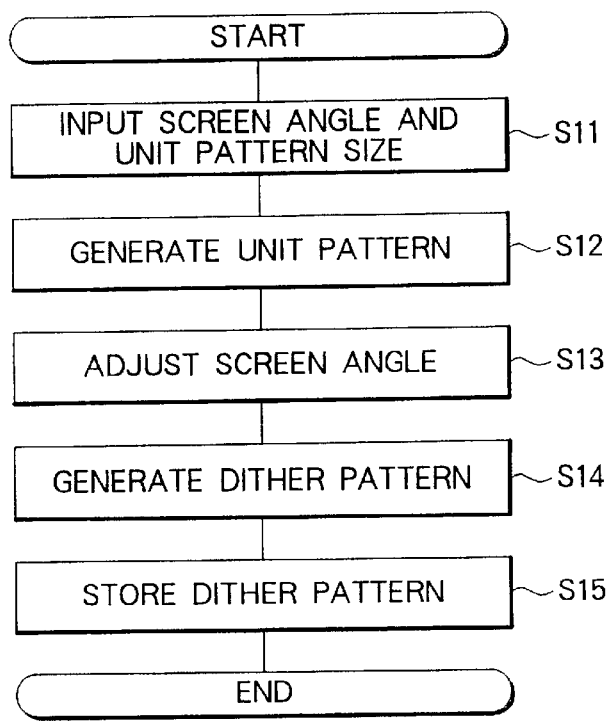
FIG. 12 is a flowchart illustrating the operation of the second embodiment.

Steps S11 and S12 in FIG. 12 are identical to the corresponding steps S1 and S2 in the first embodiment.

Figure 13:
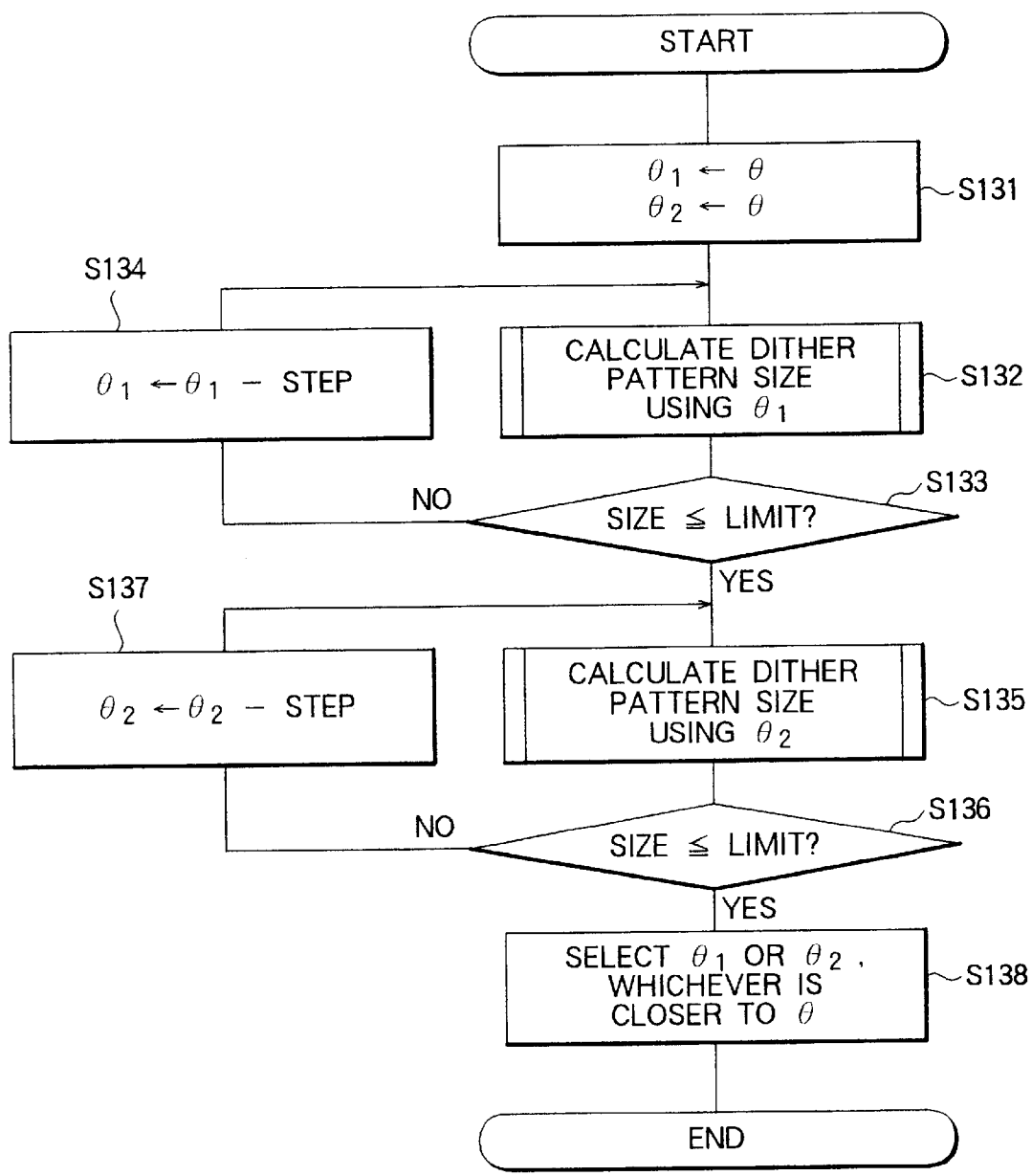
FIG. 13 is a flowchart illustrating the operation of the screen angle adjuster in the second embodiment.

In step S13, the screen angle adjuster 10 receives the screen angle θ and the size of the unit pattern 2 from the parameter input device 3, adjusts the screen angle by the procedure shown in FIG. 13, using the services of the dither pattern size calculator 7, and passes the adjusted screen angle to the dither pattern rotator 8.

In step S131 in FIG. 13, the screen angle adjuster 10 stores the input screen angle θ in two registers, referred to below as register $\theta_1$ and register $\theta_2$, thus setting variables $\theta_1$ and $\theta_2$ equal to θ.

In step S132, the dither pattern size calculator 7 uses the value set in register $\theta_1$ to calculate a dither pattern size. This calculation is performed as in the first embodiment. In step S133, the screen angle adjuster 10 compares the calculated dither pattern size with a predetermined limit. If the calculated dither pattern size exceeds the limit, the screen angle adjuster 10 reduces $\theta_1$ by subtracting a fixed step value in step S134, then returns to step S132 and has the dither pattern size calculator 7 calculate a new dither pattern size with the reduced value of $\theta_1$. The loop comprising steps S132, S133, and S134 is repeated until the calculated dither pattern size is equal to or less than the predetermined limit.

Next, in step S135, the dither pattern size calculator 7 uses the value set in register $\theta_2$ to calculate the dither pattern size again as in the first embodiment. In step S136, the screen angle adjuster 10 compares the calculated dither pattern size with the same predetermined limit. If the calculated dither pattern size exceeds the limit, the screen angle adjuster 10 increases $\theta_2$ by adding the same fixed step value in step S137, then returns to step S135. The loop comprising steps S135, S136, and S137 is repeated until the calculated dither pattern size is equal to or less than the predetermined limit.

In step S138, the screen angle adjuster 10 selects whichever of $\theta_1$ and $\theta_2$ is closer to the originally input screen angle θ, and passes the selected value to the dither pattern rotator 8 as the adjusted screen angle.

If the originally input screen angle θ yields a dither pattern size not exceeding the limit, then steps S134 and S137 will not be executed, so no adjustment will be performed; the adjusted screen angle will be equal to the original screen angle θ.

Referring again to FIG. 12, in steps S14 and S15, the dither pattern rotator 8 generates a dither pattern with the screen angle selected by the screen angle adjuster 10 and the corresponding dither pattern size, and stores the generated dither pattern in the dither pattern storage area 6. The operation of the dither pattern rotator 8 is the same as in the first embodiment.

In the first embodiment, depending on the input screen angle and unit pattern size, the dither pattern may be very large, taking up much memory space. The second embodiment avoids this situation by setting an upper limit on the dither pattern size, and adjusting the screen angle by the minimum amount necessary to obtain a dither pattern size within this limit.

Third Embodiment

In the dither patterns generated in the first and second embodiments, round-off error in the calculations performed by the dither pattern rotator 8 may lead to differences between the threshold values in different unit patterns within the dither pattern. FIG. 14, for example, shows a dither pattern generated as in the first and second embodiments from a four-by-four unit pattern, with a screen angle of fifteen degrees and threshold values from one to sixteen (instead of zero to fifteen). In the rotated unit pattern outlined by thick lines in FIG. 14, each of the threshold values should occur once, but the value thirteen occurs twice and the value nine is missing. Other rotated unit patterns show similar duplicated and missing values. The rotated unit patterns also have differing sizes and shapes.

The third embodiment changes the operation of the dither pattern generator 5 to reduce these irregularities when the screen angle is substantially equal to fifteen degrees or seventy-five degrees.

More precisely, the screen angles used in the third embodiment are substantially equal to the arctangent of one-fourth, which is substantially 14.04 degrees, and the arctangent of four, which is substantially 75.96 degrees. For simplicity in the following description, these values will be regarded as approximately equal to fifteen degrees and seventy-five degrees.

The operation of the third embodiment comprises a set of vertical shifts and a set of horizontal shifts. The operation for a screen angle of fifteen degrees is the same as the operation for seventy-five degrees except for the direction of the shifts. For fifteen degrees, the shifts are up and to the right. For seventy-five degrees, the shifts are down and to the left. Only the processing for fifteen degrees will be described below.

FIG. 15A illustrates the vertical shifts for a screen angle of fifteen degrees. A sixteen-by-sixteen matrix pattern, originally generated by placing sixteen four-by-four unit patterns vertically and horizontally adjacent to one another, has been shifted upward by an amount that increases, from left to right, by one cell for every four columns. This creates a temporary pattern.

FIG. 15B illustrates the horizontal shifts. The temporary pattern is shifted to the right by an amount that increases, from top to bottom, by one cell for every four rows.

The third embodiment has the same configuration as the first embodiment, shown in FIG. 5, but the dither pattern generator 5 operates differently. The operation of the third embodiment will be described with reference to the flowcharts in FIGS. 16 and 17.

Figure 16:
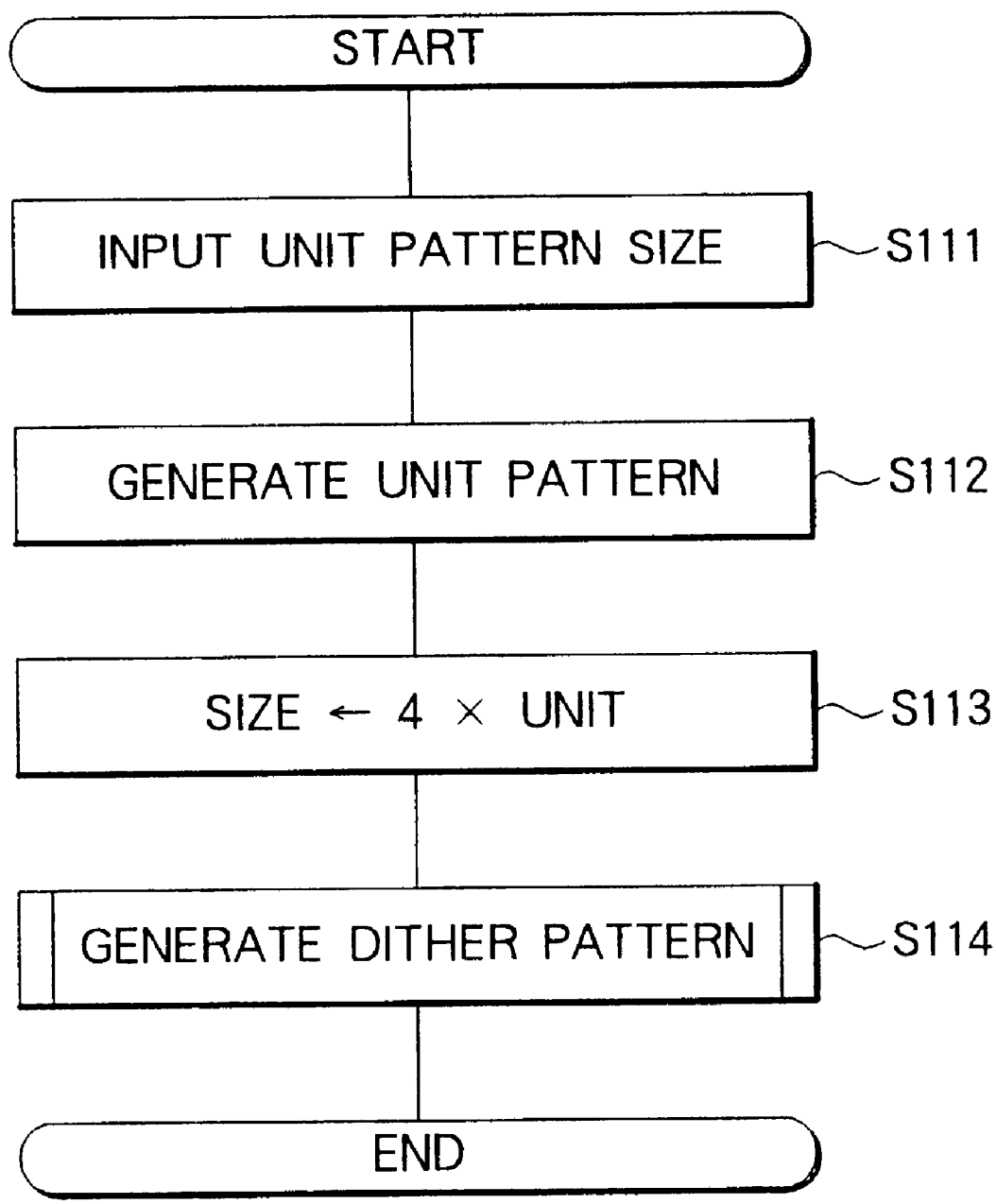
FIG. 16 is a flowchart illustrating the operation of the third embodiment.

In step S111 in FIG. 16, the unit pattern size is input from the parameter input device 3. In step S112, the unit pattern generator 4 generates a unit pattern with the specified size by assigning threshold values to cells in a matrix, as in the first embodiment. In step S113, the dither pattern size calculator 7 sets the dither pattern size to four times the unit pattern size. In step S114, the dither pattern rotator 8 generates a dither pattern of this size, with a screen angle of substantially fifteen degrees, by the procedure shown in FIG. 17.

Figure 17:
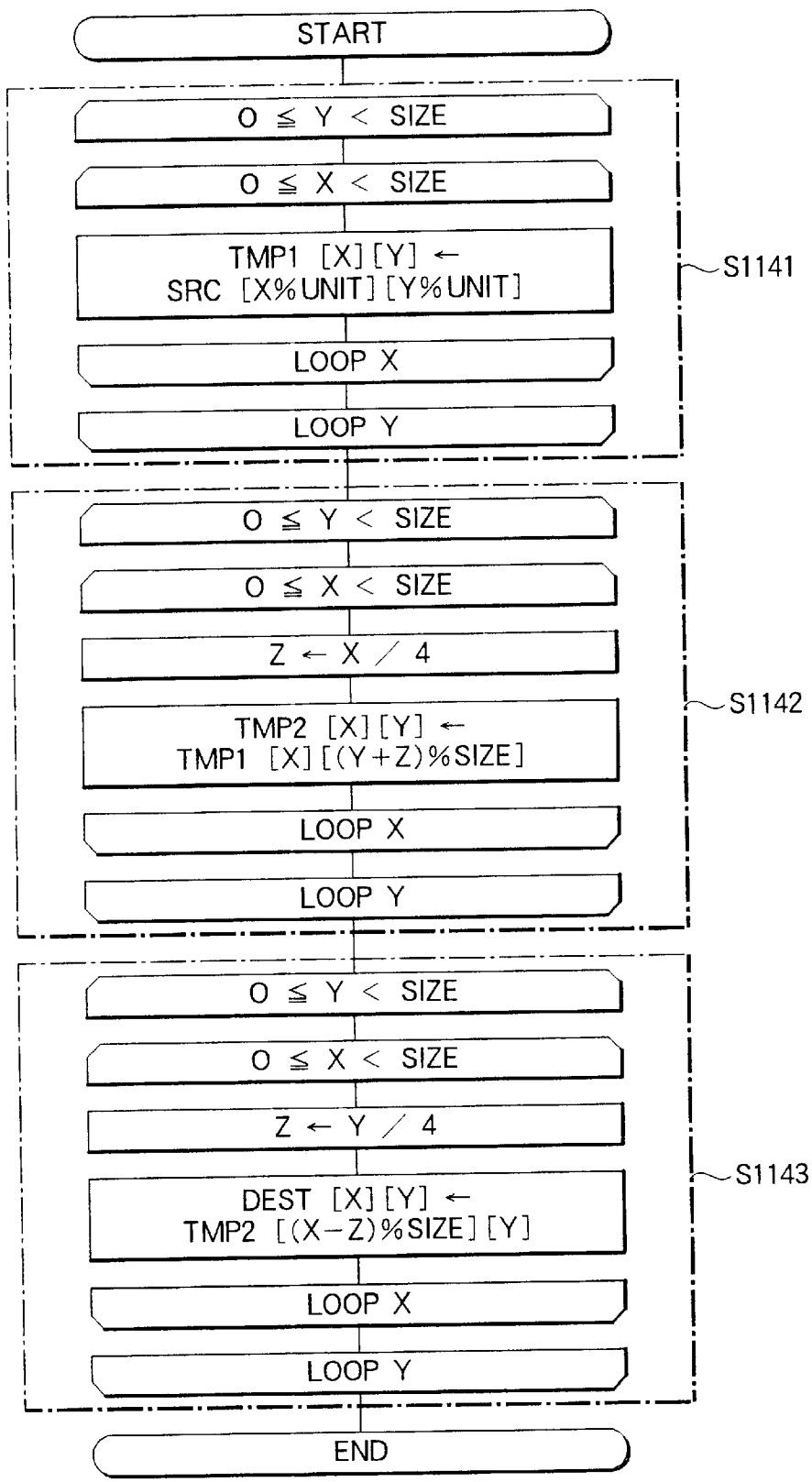
FIG. 17 is a flowchart illustrating the operation of the dither pattern rotator in the third embodiment.

In step S1141 in FIG. 17, the dither pattern rotator 8 generates a first temporary matrix TMP1 made up of copies of the unit pattern SRC placed horizontally and vertically adjacent to one another. Specifically, to determine the threshold value to place in cell TMP1[X][Y] in the first temporary matrix, the dither pattern rotator 8 divides X and Y by the unit cell size (UNIT) and takes the remainders, equal to X modulo UNIT and Y modulo UNIT, denoted [X % UNIT] and [Y % UNIT]. The cell TMP1[X][Y] receives the threshold value of cell SRC[X % UNIT][Y % UNIT] in the unit pattern. This process is repeated for all cells in the temporary pattern, by means of a nested loop as indicated in FIG. 17. The size of the first temporary matrix is the same as the dither pattern size (SIZE).

In step S1142, the dither pattern rotator 8 performs the operation shown in FIG. 15A to obtain a second temporary matrix TMP2. The threshold value in cell TMP2[X][Y] in the second temporary matrix is equal to the threshold value in cell TMP1[X][(Y+Z) % SIZE] in the first temporary dither pattern, where Z is equal to the column coordinate divided by four (X/4). This operation shifts the the column with a given X-coordinate by an amount equal to the integer part of X divided by four. The resulting Y-coordinates in the column wrap around modulo the dither pattern size; that is, SIZE is added to or subtracted from each resulting Y-coordinate to bring the resulting Y-coordinate within the range from zero to SIZE−1. Thus a cell which is shifted out of the matrix on one side is brought back in at the opposite side. This process is repeated for all cells in the second temporary matrix by means of another nested loop. The size of the second temporary matrix is also equal to the dither pattern size.

For example, to obtain the threshold value in cell with coordinates (4, 4) in TMP2, the dither pattern rotator 8 divides the X-coordinate (four) by four and sets Z equal to the quotient (one). The dither pattern size (SIZE) is greater than four, so (Y+Z) % SIZE is equal to (4+1) or five. The value TMP1(4, 5) from the first temporary dither pattern is placed in TMP2(4, 4).

In step S1143, the dither pattern rotator 8 performs the operation shown in FIG. 15B to obtain the desired dither pattern DEST. The threshold value in cell DEST[X][Y] in this dither pattern is equal to the threshold value in cell TMP2[(X−Z) % SIZE][Y] in the second temporary dither pattern, where Z is now equal to the row coordinate divided by four (Y/4). This operation shifts the row with a given Y-coordinate by an amount equal to the integer part of Y divided by four. The resulting X-coordinates in the row wrap around modulo the size parameter as explained above, so that cells shifted out of the matrix on one side are brought back in at the opposite side. This process is repeated for all cells in the dither pattern DEST by means of yet another nested loop.

For example, to obtain the threshold value in cell with coordinates (4, 4) in DEST, the dither pattern rotator 8 divides the Y-coordinate (four) by four and sets Z equal to the quotient (one). The dither pattern size (SIZE) is greater than four, so (X−Z) % SIZE is equal to (4−1) or three. The value TMP2(3, 4) from the second temporary dither pattern is placed in DEST(4, 4).

For a restricted set of screen angles substantially equal to fifteen degrees and seventy-five degrees, the third embodiment generates a dither pattern in which each threshold value occurs the same number of times.

Fourth Embodiment

The third embodiment does not, however, produce a completely regular dither pattern, because the shapes of the constituent unit patterns are distorted in different ways, depending of their positions in the dither pattern. This problem is overcome by the fourth embodiment.

The fourth operation has the same configuration as the first embodiment, shown in FIG. 5, but the operation of the dither pattern generator 5 differs from both the first and third embodiments.

Referring to FIG. 18, the fourth embodiment begins by using a square unit pattern 2 to tile a temporary matrix (TMP) 12. The number of cells on each side of the temporary matrix is a multiple of four (4×K, where K is a positive integer). This enables the temporary matrix to be divided into four-by-four blocks 13. The temporary pattern is rotated by sliding the four-by-four blocks vertically and horizontally in a way that leaves one extra cell 14 vacant beside each corner of each four-by-four block. The final dither pattern (DEST), outlined by dotted lines in FIG. 18, is completed by assigning threshold values to these extra cells 14.

Using UNIT to represent the length of one side of the unit pattern 2, and LCM to stand for the least common multiple of two integers, the dither pattern size calculator 7 in the fourth embodiment calculates the size of the dither pattern from the following equation.

$$\text{SIZE} = \text{LCM}(\text{UNIT}, 4) \times (4 + \tfrac{1}{4})$$

For a four-by-four unit pattern, for example, since LCM (4, 4) is equal to four, the size of the dither pattern is seventeen cells on a side. For a three-by-three unit pattern, LCM(3, 4) is equal to twelve, and the size of the dither pattern is fifty-one cells on a side.

Referring to FIG. 19, each extra cell 14 in the dither pattern receives the highest of the threshold values in the four adjacent cells 15. When the resulting dither pattern is used to convert a gray-level image to a bi-level image, these extra cells 14 will normally be colored (with black or another color) only if an adjacent cell 15 is colored. The extra cells thus augment existing simulated halftone dots, rather than adding extraneous dots to the simulated halftone screen pattern.

FIG. 20A illustrates the type of simulated halftone pattern generated by the fourth embodiment for an intermediate gray level, with a screen angle of fifteen degrees. FIG. 20B shows a simulated halftone pattern for a screen angle of seventy-five degrees. In both FIGS. 20A and 20B, the extra cells 14 remain uncolored.

Figure 21:
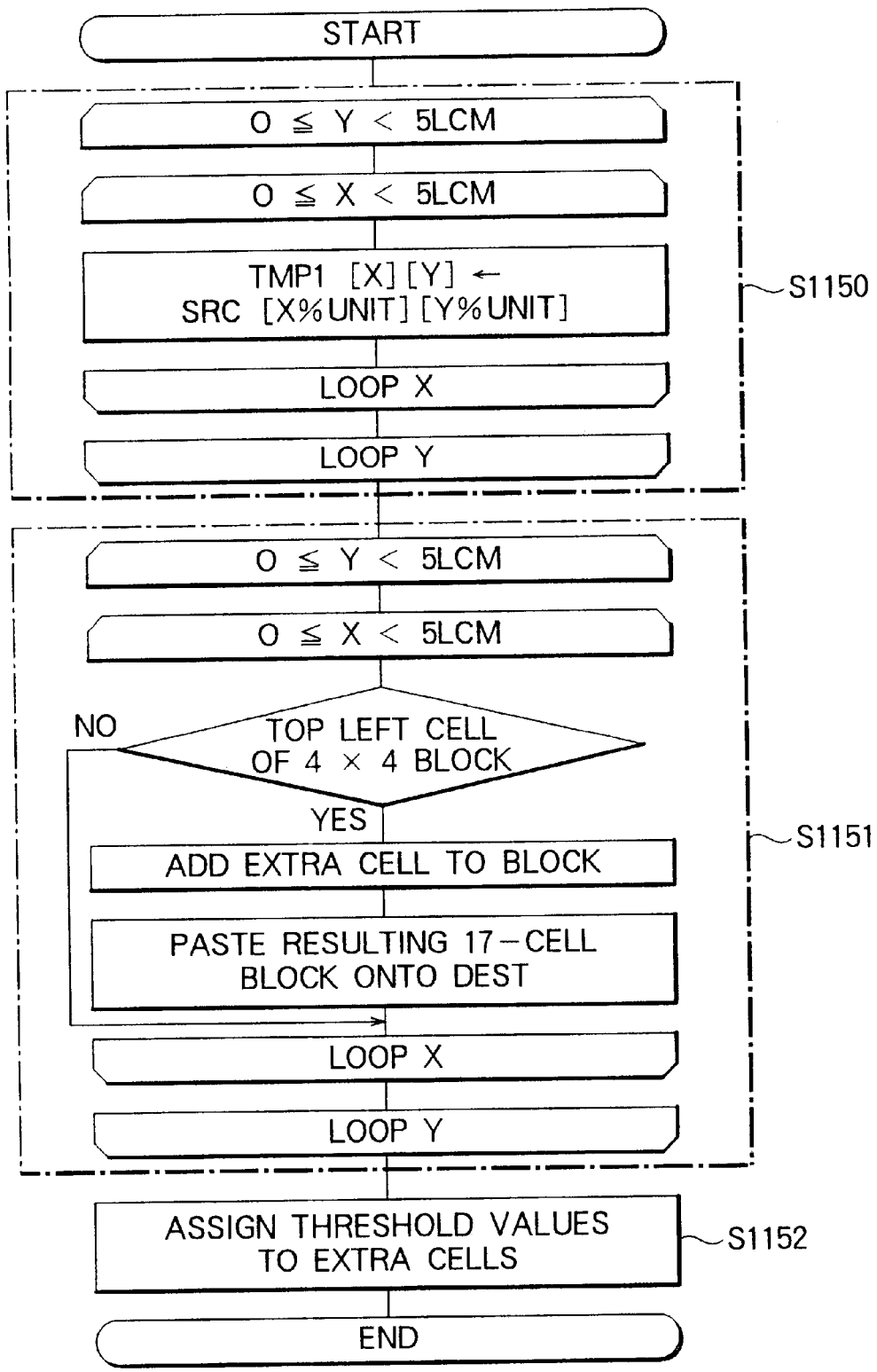
FIG. 21 is a flowchart illustrating the operation of the dither pattern rotator in the fourth embodiment.

FIG. 21 illustrates the operation of the dither pattern rotator 8 in the fourth embodiment for a screen angle of fifteen degrees.

Step S1150 is similar to step S1141 in FIG. 17. The unit pattern (SRC) is copied repeatedly into the temporary pattern (TMP) in a nested loop, by calculating X and Y coordinates modulo the unit pattern size. The size of the temporary pattern is five times the above least common multiple (5 LCM).

In step S1151, the four-by-four blocks in the temporary pattern are taken one at a time, by finding the top left corner cell in each block. An extra cell is added to each block, just to the right of the bottom right corner cell of the block, to create a block having (4×4)+1 cells, which is then pasted onto the dither matrix (DEST). The dither matrix is completely tiled with these (4×4)+1-cell blocks, cells that overflow the boundaries of the dither matrix being discarded.

FIG. 22 illustrates the pasting of six four-by-four blocks 16, 17, 18, 19, 20, and 21 as seventeen-cell blocks 16', 17', 18', 19', 20', and 21' on the dither matrix (DEST). Other four-by-four blocks are pasted in the same say, following the scheme shown in FIG. 18.

The top left corner cell of the dither matrix DEST has coordinates (0, 0) in FIG. 22. The first seventeen-cell block 16' is pasted with its top left corner below and to the left of the top left corner of the dither matrix, e.g. at (−4, 1), so that the pasted blocks entirely cover the dither pattern. The general formula (−LCM, LCM/4) can be used to obtain the coordinates at which top left corner cell of the first seventeen-cell block should be pasted.

Of the cells in block 16', only the extra cell 14 is actually used in the dither pattern in FIG. 22. The other cells of block 16' are discarded. The discarded cell adjacent to the extra cell 14 is used, however, in determining the threshold value of the extra cell 14.

In step S1152, after all blocks have been pasted, the extra cells 14 are assigned the highest of the adjacent threshold values, as explained in FIG. 19, to complete the dither pattern.

In the fourth embodiment, since the shape of the unit patterns is preserved, a highly regular dither pattern is generated, and printed or displayed output of very high quality can be obtained.

The screen angle in the fourth embodiment as described above is substantially fifteen degrees, but a dither pattern with a screen angle of substantially seventy-five degrees can be obtained in the same way, the four-by-four blocks being shifted down and to the left instead of up and to the right, and the extra cells being added at a position below the bottom right corner of each four-by-four block. Combined with existing dither patterns having screen angles of forty-five degrees and zero degrees, a complete set of dither patterns for four-color printing with the screen angles shown in FIG. 4 can thus be obtained.

In the first embodiment, it is not necessary for the unit pattern and dither pattern to be placed in the first and fourth quadrants of the coordinate system, or to be placed with their corners at the origin. It is only necessary for the sides of the unit pattern and dither pattern to be parallel to the axes of the coordinate system. For example, the dither pattern could be centered at the origin of the coordinate system.

In the third embodiment, the horizontal shifts can be performed before the vertical shifts.

The third and fourth embodiments can be modified to provide dither patterns for screen angles substantially equal to the arctangent of 1/N and the arctangent of N, for various integers N. In the third embodiment, the size of the temporary matrices and dither pattern is N times the unit pattern size, and N must be greater than unity. In the fourth embodiment, the size of the dither pattern is (N+1/N) times the least common multiple of N and the unit pattern size, and N can be any positive integer.

Those skilled in the art will recognize that further variations are possible within the scope claimed below.

What is claimed is:

1. A method of generating a dither pattern that simulates a halftone screen with an arbitrary screen angle $\theta$, for use in converting a gray-scale image to a bi-level image, comprising the steps of:

specifying a unit pattern size;

generating a unit pattern by placing threshold values in a predetermined order in a first matrix of cells having, on each side, a number of cells equal to said unit pattern size;

finding two integers m and n, both multiples of said unit pattern size, such that m×sin $\theta$ is equal to n×cos $\theta$, within a certain precision level;

setting a dither pattern size equal to (m×cos $\theta$)+(n×sin $\theta$), with integer precision;

generating a second matrix of cells having, on each side, a number of cells equal to said dither pattern size;

placing said first matrix in a two-dimensional Cartesian coordinate system having axes parallel to sides of said first matrix;

placing said second matrix in said coordinate system, sides of said second matrix being parallel to the axes of said coordinate system;

rotating each cell of said second matrix by said screen angle $\theta$ around an origin of said coordinate system;

moving each said cell of said second matrix parallel to the axes of said coordinate system in steps equal to said unit pattern size, until said cell is centered within a corresponding cell in said first matrix; and assigning to each said cell in said second matrix a threshold value equal to the threshold value of said corresponding cell, thereby obtaining said dither pattern.

2. The method of claim 1, wherein the threshold values placed in said first matrix increase with increasing distance from a center of said first matrix.

3. The method of claim 1, comprising the further steps of:

generating first adjusted screen angles, starting from said screen angle $\theta$ and increasing in steps of a certain step size, and calculating a dither pattern as described in claim 1 for each first adjusted screen angle, until a dither pattern size not exceeding a predetermined limit is obtained;

generating second adjusted screen angles, starting from said screen angle $\theta$ and decreasing in steps of said step size, and calculating a dither pattern as described in claim 1 for each second adjusted screen angle, until a dither pattern size not exceeding said limit is obtained; and replacing said screen angle $\theta$ with an adjusted screen angle, among said first adjusted screen angles and said second adjusted screen angles, that gives a dither pattern size not exceeding said limit, and is as close as possible to said screen angle $\theta$.

4. A method of generating a dither pattern that simulates a halftone screen, for use in converting a gray-scale image to a bi-level image, comprising the steps of:

specifying a unit pattern size;

generating a unit pattern by placing threshold values in a predetermined order in a first matrix of cells having, on each side, a number of cells equal to said unit pattern size;

generating a second matrix of cells having row coordinates and column coordinates, and having, on each side, a number of cells equal to N times said unit pattern size, by placing N×N copies of said first matrix vertically and horizontally adjacent to one another, N being an integer greater than unity;

shifting each column of cells of said second matrix vertically by an amount equal to an integer part of a column coordinate of said column divided by N, cells shifted out of said second matrix wrapping around to an opposite side of said second matrix; and shifting each row of said second matrix horizontally by an amount equal to an integer part of a row coordinate of said row divided by N, cells shifted out of said second matrix wrapping around to an opposite side of said second matrix, thereby obtaining said dither pattern.

5. The method of claim 4, wherein the threshold values placed in said first matrix increase with increasing distance from a center of said first matrix.

6. The method of claim 4, wherein N is equal to four.

7. A method of generating a dither pattern that simulates a halftone screen, for use in converting a gray-scale image to a bi-level image, comprising the steps of:

specifying a unit pattern size;

generating a unit pattern by placing threshold values in a predetermined order in a first matrix of cells having, on each side, a number of cells equal to said unit pattern size;

calculating a least common multiple of said unit pattern size and a positive integer N;

generating a temporary matrix of cells having, on each side, a number of cells equal to (N+1) times said least common multiple, by placing copies of said first matrix vertically and horizontally adjacent to one another;

dividing said temporary matrix into N×N blocks of cells;

adding one extra cell to each N×N block in said temporary matrix, in a predetermined position adjacent a predetermined corner cell of said N×N block, thereby obtaining a set of (N×N)+1-cell blocks;

generating a second matrix having, on each side, a number of cells equal to (N+1/N) times said least common multiple; and assigning threshold values to said second matrix by tiling said second matrix with said (N×N)+1-cell blocks, each said extra cell receiving a threshold value equal to a maximum value among threshold values in adjacent cells, cells overflowing boundaries of said second matrix being discarded, thereby obtaining said dither pattern.

8. The method of claim 7, wherein the threshold values placed in said first matrix increase with increasing distance from a center of said first matrix.

9. The method of claim 7, wherein N is equal to four.

10. An apparatus for generating a dither pattern that simulates a halftone screen with an arbitrary screen angle $\theta$, for use in converting a gray-scale image to a bi-level image, comprising:

a parameter input device for receiving input of a unit pattern size and said screen angle $\theta$;

a dither pattern storage area;

a unit pattern generator coupled to said parameter input device, for generating a unit pattern by placing threshold values in a predetermined order in a first matrix of cells having, on each side, a number of cells equal to said unit pattern size;

a dither pattern size calculator coupled to said parameter input device, for finding two integers m and n, both multiples of said unit pattern size, such that m×sin $\theta$ is equal to n×cos $\theta$, within a certain precision level, then setting a dither pattern size equal to (m×cos $\theta$)+(n×sin $\theta$) with integer precision, and generating a second matrix of cells having, on each side, a number of cells equal to said dither pattern size; and a dither pattern rotator coupled to said unit pattern generator, said dither pattern size calculator, and said dither pattern storage area, for placing said first matrix in a two-dimensional Cartesian coordinate system having axes parallel to sides of said first matrix, placing said second matrix in said coordinate system, sides of said second matrix being parallel to the axes of said coordinate system, rotating each cell of said second matrix by said screen angle $\theta$ around an origin of said coordinate system, then moving each said cell of said second matrix horizontally and vertically in steps equal to said unit pattern size, until said cell is centered within a corresponding cell in said first matrix, assigning to each said cell in said second matrix a threshold value equal to the threshold value of said corresponding cell, thereby obtaining said dither pattern, and storing said dither pattern in said dither pattern storage area.

11. The apparatus of claim 10, wherein the threshold values placed in said first matrix increase with increasing distance from a center of said first matrix.

12. The apparatus of claim 10, further comprising:

a screen angle adjuster for generating first adjusted screen angles, starting from said screen angle $\theta$ and increasing in steps of a certain step size, and calculating a dither pattern as described in claim 10 for each first adjusted screen angle until a dither pattern size not exceeding a predetermined limit is obtained; generating second adjusted screen angles, starting from said screen angle $\theta$ and decreasing in steps of said step size, and calculating a dither pattern as described in claim 10 for each second adjusted screen angle, until a dither pattern size not exceeding said limit is obtained; and replacing said screen angle $\theta$ with an adjusted screen angle, among said first adjusted screen angles and said second adjusted screen angles, that gives a dither pattern size not exceeding said limit and is as close as possible to said screen angle $\theta$.

13. An apparatus for generating a dither pattern that simulates a halftone screen, for use in converting a gray-scale image to a bi-level image, comprising:

a parameter input device for receiving input of a unit pattern size;

a dither pattern storage area;

a unit pattern generator coupled to said parameter input device, for generating a unit pattern by placing threshold values in a predetermined order in a first matrix of cells having, on each side, a number of cells equal to said unit pattern size; and a dither pattern generator, coupled to said unit pattern generator and said dither pattern storage area, for generating a second matrix of cells having row coordinates and column coordinates, and having, on each side, a number of cells equal to N times said unit pattern, by placing N×N copies of said first matrix vertically and horizontally adjacent to one another, shifting each column of cells of said second matrix vertically by an amount equal to an integer part of a column coordinate of said column divided by N, cells shifted out of said second matrix wrapping around to an opposite side of said second matrix, shifting each row of said second matrix horizontally by an amount equal to an integer part of a row coordinate of said row divided by N, cells shifted out of said second matrix wrapping around to an opposite side of said second matrix, thereby obtaining said dither pattern, and storing said dither pattern in said dither pattern storage area.

14. The apparatus of claim 13, wherein the threshold values placed in said first matrix increase with increasing distance from a center of said first matrix.

15. The apparatus of claim 13, wherein N is equal to four.

16. An apparatus for generating a dither pattern that simulates a halftone screen, for use in converting a gray-scale image to a bi-level image, comprising:

a parameter input device for receiving input of a unit pattern size and said screen angle $\theta$;

a dither pattern storage area;

a unit pattern generator coupled to said parameter input device, for generating a unit pattern by placing threshold values in a predetermined order in a first matrix of cells having, on each side, a number of cells equal to said unit pattern size; and a dither pattern generator for calculating a least common multiple of said unit pattern size and a certain positive integer N, generating a temporary matrix of cells having, on each side, a number of cells equal to (N+1)

times said least common multiple by placing copies of said first matrix vertically and horizontally adjacent to one another, dividing said temporary matrix into N×N blocks of cells, adding an extra cell in a predetermined position adjacent a predetermined corner cell of each said N×N block, thereby obtaining a set of (N×N)+1-cell blocks, generating a second matrix having, on each side, a number of cells equal to (N+1/N) times said least common multiple, assigning threshold values to said second matrix by tiling said second matrix with said (N×N)+1-cell blocks, each said extra cell receiving a threshold value equal to a maximum value among threshold values in adjacent cells, and cells overflowing boundaries of said second matrix being discarded, thereby obtaining said dither pattern, and storing said dither pattern in said dither pattern storage area.

17. The apparatus of claim 16, wherein the threshold values placed in said first matrix increase with increasing distance from a center of said first matrix.

18. The apparatus of claim 16, wherein N is equal to four.

* * * * *